US012632225B2

(12) United States Patent
Stanek et al.

(10) Patent No.: US 12,632,225 B2
(45) Date of Patent: May 19, 2026

(54) CUSTOM TEXTUAL DOMAIN SPECIFIC LANGUAGE DESCRIBING AN HMI APPLICATION

(71) Applicant: Rockwell Automation Technologies, Inc., Mayfield Heights, OH (US)

(72) Inventors: Chris E Stanek, Willoughby, OH (US); Steven Kowal, Milwaukee, WI (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 133 days.

(21) Appl. No.: 18/300,015

(22) Filed: Apr. 13, 2023

(65) Prior Publication Data

US 2024/0345809 A1 Oct. 17, 2024

(51) Int. Cl.
*G06F 8/34* (2018.01)
*G06F 8/38* (2018.01)

(52) U.S. Cl.
CPC .................. *G06F 8/34* (2013.01); *G06F 8/38* (2013.01)

(58) Field of Classification Search
CPC ..................................... G06F 8/38; G06F 8/34
See application file for complete search history.

(56) References Cited

U.S. PATENT DOCUMENTS

| | | | |
|---|---|---|---|
| 8,731,691 B2 | 5/2014 | Lloyd | |
| 8,798,775 B2 | 8/2014 | Plache et al. | |
| 9,483,240 B1 * | 11/2016 | Boyar ................. | G06F 9/45516 |
| 9,547,291 B2 * | 1/2017 | Tran ........................ | G05B 15/02 |
| 11,269,598 B2 | 3/2022 | Staas et al. | |
| 2010/0275139 A1 * | 10/2010 | Hammack .......... | G05B 19/0426 |
| | | | 715/763 |

(Continued)

FOREIGN PATENT DOCUMENTS

EP 2608025 A1 6/2013

OTHER PUBLICATIONS

Jeanjean et al. "From DSL specification to interactive computer programming environment." Proceedings of the 12th ACM SIGPLAN International Conference on Software Language Engineering. 2019. Retrieved from the Internet: URL<https://dl.acm.org/doi/abs/10.1145/3357766.3359540>.*

(Continued)

*Primary Examiner* — S. Sough
*Assistant Examiner* — Cheneca Smith
(74) *Attorney, Agent, or Firm* — Amin, Turocy & Watson, LLP

(57) ABSTRACT

A human-machine interface (HMI) development system supports a custom textual domain-specific language (DSL) for describing and developing HMI applications. The custom DSL comprises user domain elements corresponding to elements used within the context of a graphical HMI editor, and can be used to describe all aspects of an HMI application in terms of these user domains. Since the DSL is a textual syntax, this approach also allows HMI applications to be developed using any text editor. The DSL can be used to define, using text-based programming, such HMI properties as the graphical elements to be included in the HMI application, element layouts in reference to other graphical elements, element behaviors and actions, commands and custom executable code for specific interactions of the graphics.

20 Claims, 9 Drawing Sheets

(56) References Cited

U.S. PATENT DOCUMENTS

| | | | |
|---|---|---|---|
| 2012/0194502 A1* | 8/2012 | Smith | G06F 8/38 |
| | | | 345/418 |
| 2012/0209412 A1 | 8/2012 | Lloyd | |
| 2013/0006395 A1 | 1/2013 | Plache et al. | |
| 2017/0329299 A1* | 11/2017 | Plache | G05B 19/0426 |
| 2019/0052542 A1* | 2/2019 | Passante | G06F 16/903 |
| 2021/0089276 A1* | 3/2021 | Dunn | G05B 19/41845 |
| 2021/0141614 A1 | 5/2021 | Staas et al. | |

OTHER PUBLICATIONS

Krahn et al. "Roles in software development using domain specific modeling languages." arXiv preprint arXiv:1409.6618 (2014). Retrieved from the Internet: URL<https://arxiv.org/pdf/1409.6618>.*

* cited by examiner

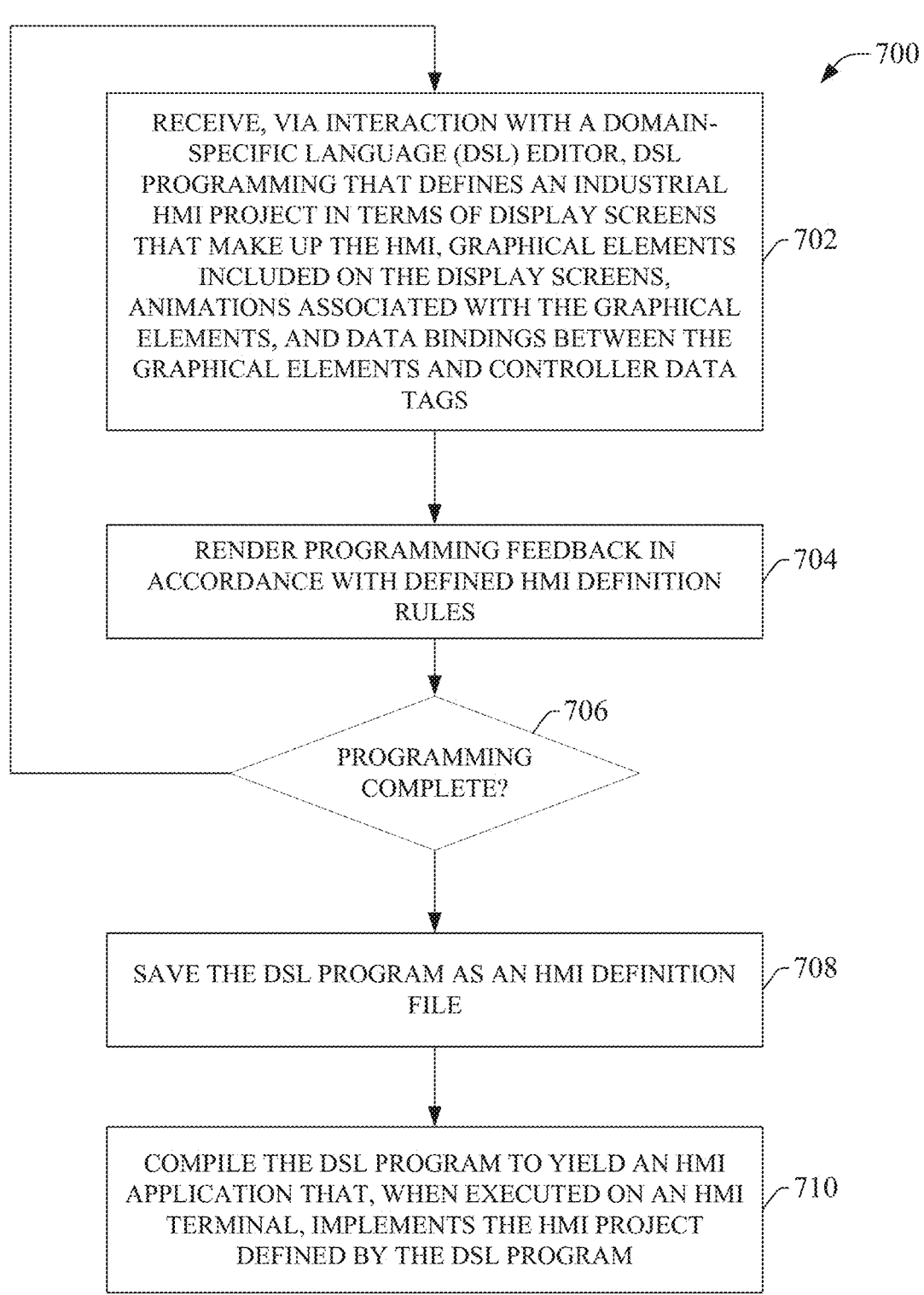

700

RECEIVE, VIA INTERACTION WITH A DOMAIN-SPECIFIC LANGUAGE (DSL) EDITOR, DSL PROGRAMMING THAT DEFINES AN INDUSTRIAL HMI PROJECT IN TERMS OF DISPLAY SCREENS THAT MAKE UP THE HMI, GRAPHICAL ELEMENTS INCLUDED ON THE DISPLAY SCREENS, ANIMATIONS ASSOCIATED WITH THE GRAPHICAL ELEMENTS, AND DATA BINDINGS BETWEEN THE GRAPHICAL ELEMENTS AND CONTROLLER DATA TAGS — 702

RENDER PROGRAMMING FEEDBACK IN ACCORDANCE WITH DEFINED HMI DEFINITION RULES — 704

PROGRAMMING COMPLETE? — 706

SAVE THE DSL PROGRAM AS AN HMI DEFINITION FILE — 708

COMPILE THE DSL PROGRAM TO YIELD AN HMI APPLICATION THAT, WHEN EXECUTED ON AN HMI TERMINAL, IMPLEMENTS THE HMI PROJECT DEFINED BY THE DSL PROGRAM — 710

FIG. 7

CUSTOM TEXTUAL DOMAIN SPECIFIC LANGUAGE DESCRIBING AN HMI APPLICATION

TECHNICAL FIELD

The subject matter disclosed herein relates generally to industrial automation systems, and, for example, to development of human-machine interfaces (HMIs).

BACKGROUND ART

Human-machine interfaces (HMIs) are used to visualize operational and status information for industrial processes and to allow an operator to issue commands to the process or to update process parameters. A typical HMI comprises a computer terminal with display capabilities that executes an HMI application. The HMI application defines the display screens that are presented to the operator, the navigation structure for navigating between the display screens, and the data links or bindings between the graphical elements and corresponding data tags in the controller's data table. Developers typically design these aspects of an HMI using an HMI development platform, which compiles the design into an HMI application that can be downloaded and executed on the HMI terminal. These HMI development platforms typically support a graphical and menu-driven development workflow, in which the developer selects graphical display and control elements from a library of elements for inclusion on each display interface, and manipulates these selected elements—e.g., via drag-and-drop interactions—on a mock-up of the display interface to yield a desired layout.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for developing human-machine interface (HMI) applications is provided, comprising a user interface component configured to receive domain-specific language (DSL) programming that defines aspects of an HMI application, wherein the aspects comprise at least a display screen of the HMI application, a graphical element to be included on the display screen, and an animation associated with the graphical element; and an HMI generation component configured to compile the DSL programming to yield an HMI application capable of execution on an HMI terminal.

Also, one or more embodiments provide a method, comprising receiving, by a system comprising a processor, a domain-specific language (DSL) program that describes at least a display screen of a human-machine interface (HMI) application, a graphical element to be rendered on the display screen, and an animation associated with the graphical element; and compiling, by the system, the DSL program to yield an HMI application that, in response to execution on an HMI terminal, implements the HMI application.

Also, according to one or more embodiments, a non-transitory computer-readable medium is provided having stored thereon instructions that, in response to execution, cause a system to perform operations, the operations comprising receiving design input for a human-machine interface (HMI) project, wherein the design input comprises domain-specific language (DSL) programming that describes at least a display screen of the HMI application, a graphical element to be rendered on the display screen, and an animation associated with the graphical element; and compiling the DSL programming to yield an HMI application that, in response to execution on an HMI terminal, implements the HMI project.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 7 is a flowchart of an example methodology for defining an HMI application using a custom, HMI-specific DSL program.

DETAILED DESCRIPTION

Figure 1:
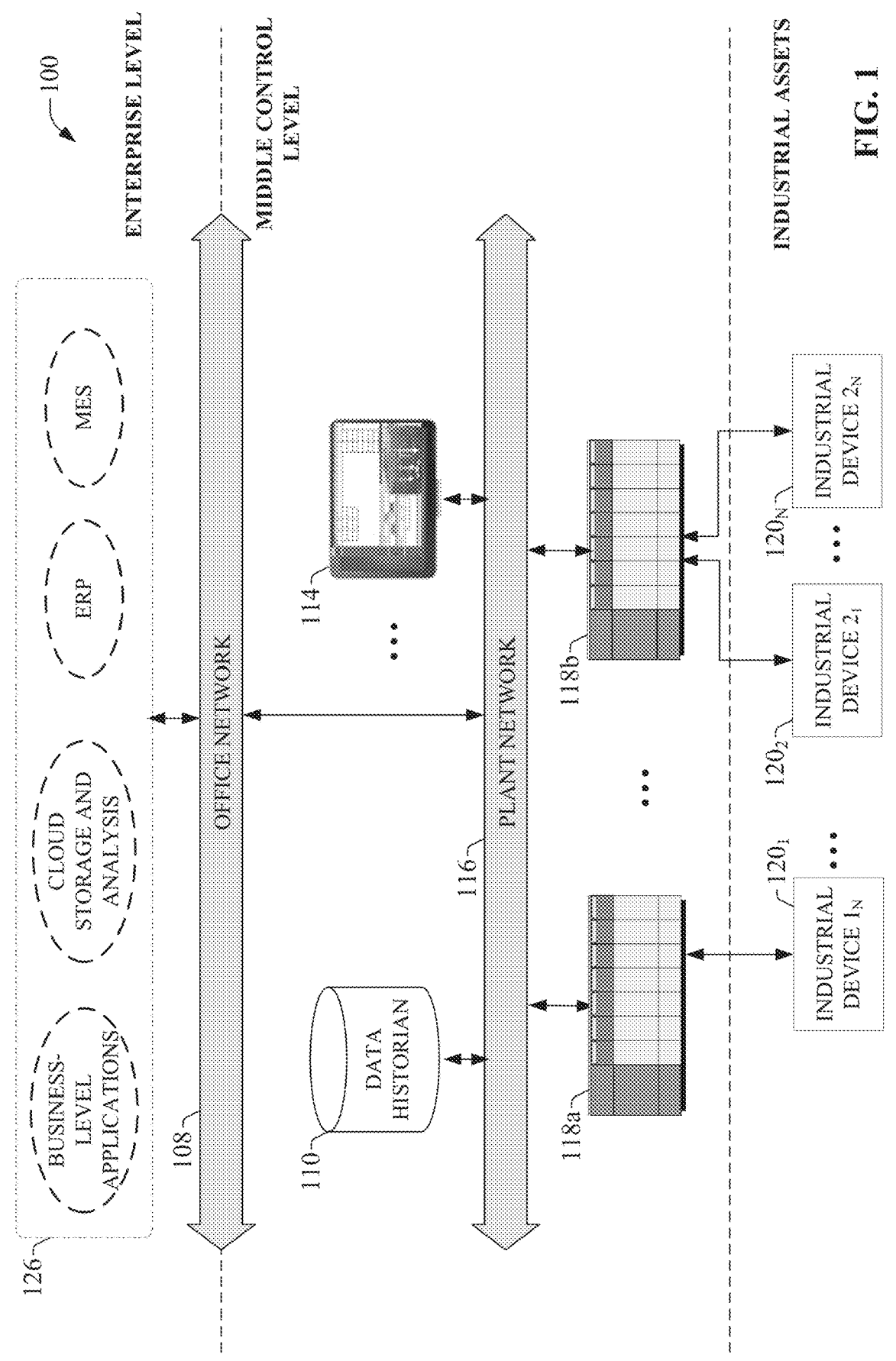
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial control environment 100. In this example environment, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise substantially any type of code capable of processing input signals read from the industrial devices 120 and controlling output signals generated by the industrial controllers 118, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, pumps, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by their associated control programs and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 exchanges data with the industrial controllers 118 over a plant network 116 or another communication channel and visualizes information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 render display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on states of machines or devices, render alarm notifications, or employ other such techniques for presenting relevant data to the operator. HMIs 114 present this information based on data read from industrial controllers 118, which is presented on the display screens according to display formats chosen by the HMI developer. HMIs 114 may be fixed location or mobile devices that execute user-installed or pre-installed operating systems and graphical application software.

Some industrial environments may also include other systems or devices relating to specific aspects of the controlled industrial systems. These may include, for example, a data historian 110 that aggregates and stores production information collected from the industrial controllers 118 or other data sources, device documentation stores containing electronic documentation for the various industrial devices making up the controlled industrial systems, inventory tracking systems, work order management systems, repositories for machine or process drawings and documentation, vendor product documentation storage, vendor knowledge-bases, internal knowledgebases, work scheduling applications, or other such systems, some or all of which may reside on an office network 108 of the industrial environment.

Higher-level systems 126 may carry out functions that are less directly related to control of the industrial automation systems on the plant floor, and instead are directed to long term planning, high-level supervisory control, analytics, reporting, or other such high-level functions. These systems 126 may reside on the office network 108 at an external location relative to the plant facility, or on a cloud platform with access to the office and/or plant networks. Higher-level systems 126 may include, but are not limited to, cloud storage and analysis systems, big data analysis systems, manufacturing execution systems, data lakes, reporting systems, etc. In some scenarios, applications running at these higher levels of the enterprise may be configured to analyze control system operational data, and the results of this analysis may be fed back to an operator at the control system or directly to a controller 118 or device 120 in the control system.

Figure 2:
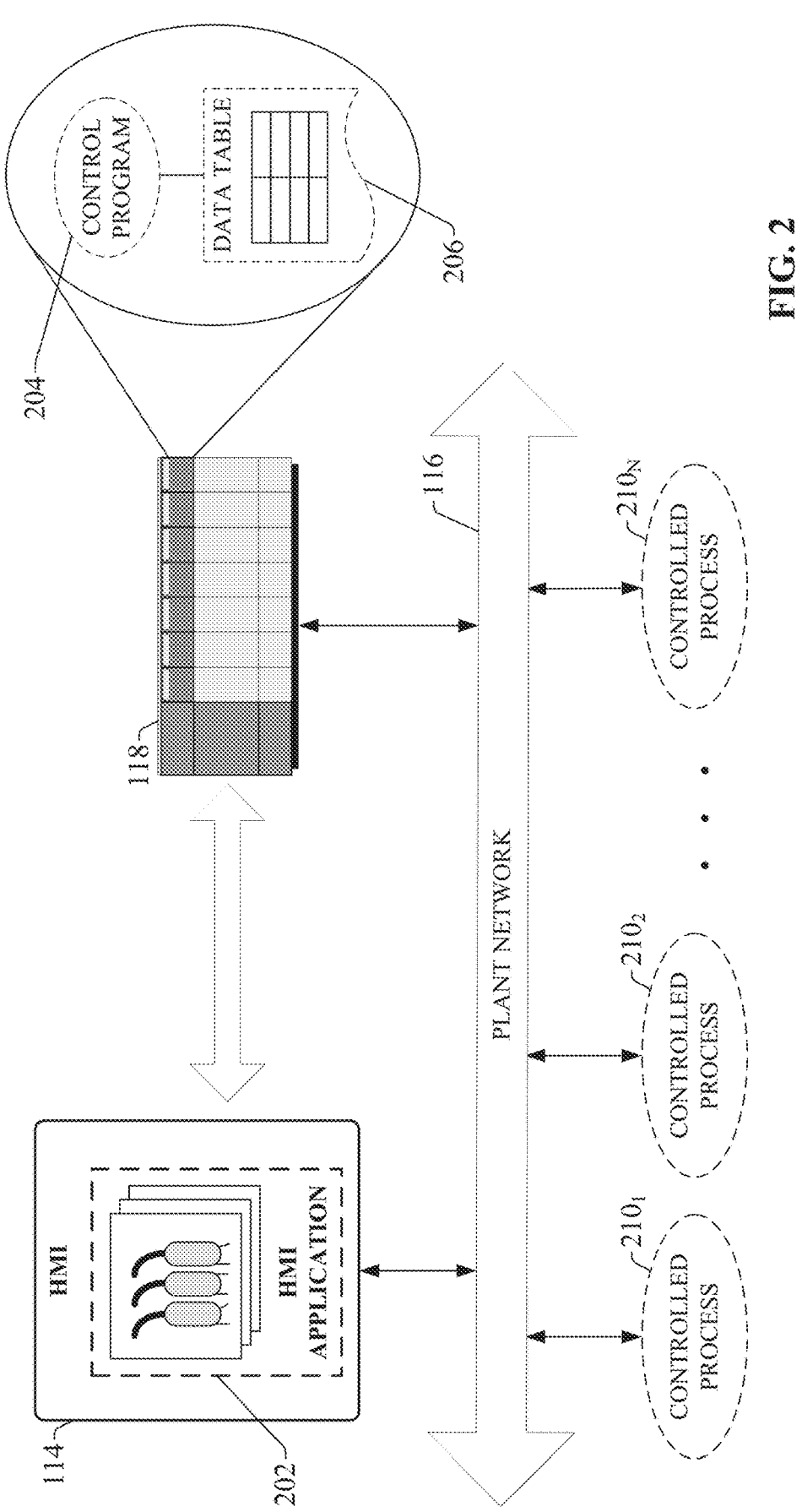
FIG. 2 is a diagram of a generalized architecture including an industrial controller and an HMI.

FIG. 2 is a diagram of a generalized architecture including an industrial controller 118 and an HMI 114. An industrial facility can comprise one or more controlled processes 210₁-210_N relating to product manufacture, machining, motion control, batch processing, material handling, or other such industrial functions. As noted above, the devices and machines that carry out the processes 210₁-210_N (e.g., devices 120 of FIG. 1 and their associated machines) can be monitored and controlled by an industrial controller 118, which executes a control program 204 to facilitate monitoring and control of controlled processes 210₁-210_N. Control program 204 can be substantially any type of code used to process input signals read into the controller 118 and to control output signals from the controller 118, including but not limited to ladder logic programming, sequential function charts, function block diagrams, or structured text. Data read into or generated by controller 118 can be stored in a data table 206 within the controller's memory.

Controller 118 can exchange data with the input and output devices of the controlled processes 2101-210N over the plant network 116, or over another hardwired or networked connection. For example, controller 118 can be equipped with native hardwired input and output points that exchange digital and analog signals with the field devices to effect control of the devices. The native controller I/O can include digital I/O that transmits and receives discrete voltage signals to and from the field devices, or analog I/O that transmits and receives analog voltage or current signals to and from the devices. The controller 118 translates input signals from the controlled processes 210 into digital and analog data values, which are stored in the controller's data table 206. The control program 204 processes these input data values in accordance with a user-defined control algorithm and sets values of the controller's digital and analog output signals based on this processing. The values of the output signals, and any other values calculated by the control program 204, are stored in the data table 206.

HMI 114 leverages data stored in the controller's data table 206 to visualize information relating to the controlled processes 2101-210N as graphical and alphanumeric information. To this end, the HMI 114 communicates with the controller 118 via the plant network 116 or via a direct connection, and reads data from and writes data to the data table 206 over this connection. The HMI 114 renders navigable interface display screens that present current operational or status information for the controlled processes 210₁-210_N. In some implementations, the display screens can render graphical representations of the machines that carry out the controlled processes 210₁-210_N, and can animate these graphical representations based on the current statuses of the corresponding machines, as determined based on the data values contained in the controller's data table 206. These animations can include, for example, setting a color of a graphical element based on a state of a corresponding machine component, altering the height of a fill graphic based on a corresponding fill level of a tank, setting a position or orientation of a graphical element based on a corresponding position or orientation of a machine component, displaying alphanumeric text conveying metered values (e.g., temperatures, pressures, flows, etc.), or other such animations.

Operators can also interact with the HMI's display screens to send commands to the controller 118 that alter operation of the controlled processes 2101-210N. These commands can include, for example, altering control setpoints, initiating start or stop commands, changing an operating mode of a machine or process, or other such commands. To provide a means to issue these commands, the display screens can include interactive graphical controls—such as graphical pushbuttons, data entry fields, or other such controls—that are linked to corresponding data tags defined in the data table 206. Through interaction with these controls, the operator can write digital or analog values to these data tags, and these values are processed by the control program 204 in connection with controlling the industrial processes $210_1$-$210_N$.

In general, an HMI 114 comprises a computer terminal with display capabilities that executes an HMI application 202. The HMI application 202 defines the display screens that are presented to the operator (including definitions of the graphical elements and controls included on each display screen and the arrangements of those elements), the navigation structure for navigating between the display screens, and the data links or bindings between the graphical elements and corresponding data tags in the controller's data table 206. HMI developers typically design these aspects of an HMI using an HMI development platform, which compiles the design into an HMI application 202 that can be downloaded and executed on the HMI terminal. These HMI development platforms typically support a graphical and menu-driven development workflow, in which the developer selects graphical display and control elements from a library of elements for inclusion on each display interface, and manipulates these selected elements—e.g., via drag-and-drop interactions—on a mock-up of the display interface to yield a desired layout. For elements whose appearance or behavior is a function of a value of a data tag defined in the controller's data table 206, the developer typically defines the binding to the appropriate data tag by invoking the element's properties window and specifying the data tag in an appropriate property field of the window. Similarly, for elements designed to write data to the controller 118—such as graphical pushbuttons and data entry fields—the data tags to which those elements write their data are set via interaction with the elements' properties windows.

While this graphical and menu-driven workflow offers an intuitive development approach that allows users with limited programming experience to design HMI applications 202, this graphical development approach can also be cumbersome and time-consuming.

As an alternative to this graphical HMI development approach, one or more embodiments described herein provide an HMI development system that supports a custom textual domain-specific language (DSL) for describing and developing HMI applications 202. The custom DSL can comprise user domain elements corresponding to elements used within the context of a graphical HMI editor, and can be used to describe all aspects of an HMI application 202 in terms of these user domains. Since the DSL is a textual programming language, the development system allows an HMI application to be developed using any text editor. The DSL can be used to define, using text-based programming, such HMI properties as the graphical elements to be included in the HMI application, element layouts in reference to other graphical elements, element behaviors and actions, events (e.g., an interaction or a change) that trigger an action or notification, commands and custom executable code for specific interactions of the graphics. The DSL combines a text-based custom programming syntax that is familiar to users of other languages such as C++, JavaScript, or Java, with HMI user domains and terminology that is familiar to developers of graphical HMI editors.

Figure 3:
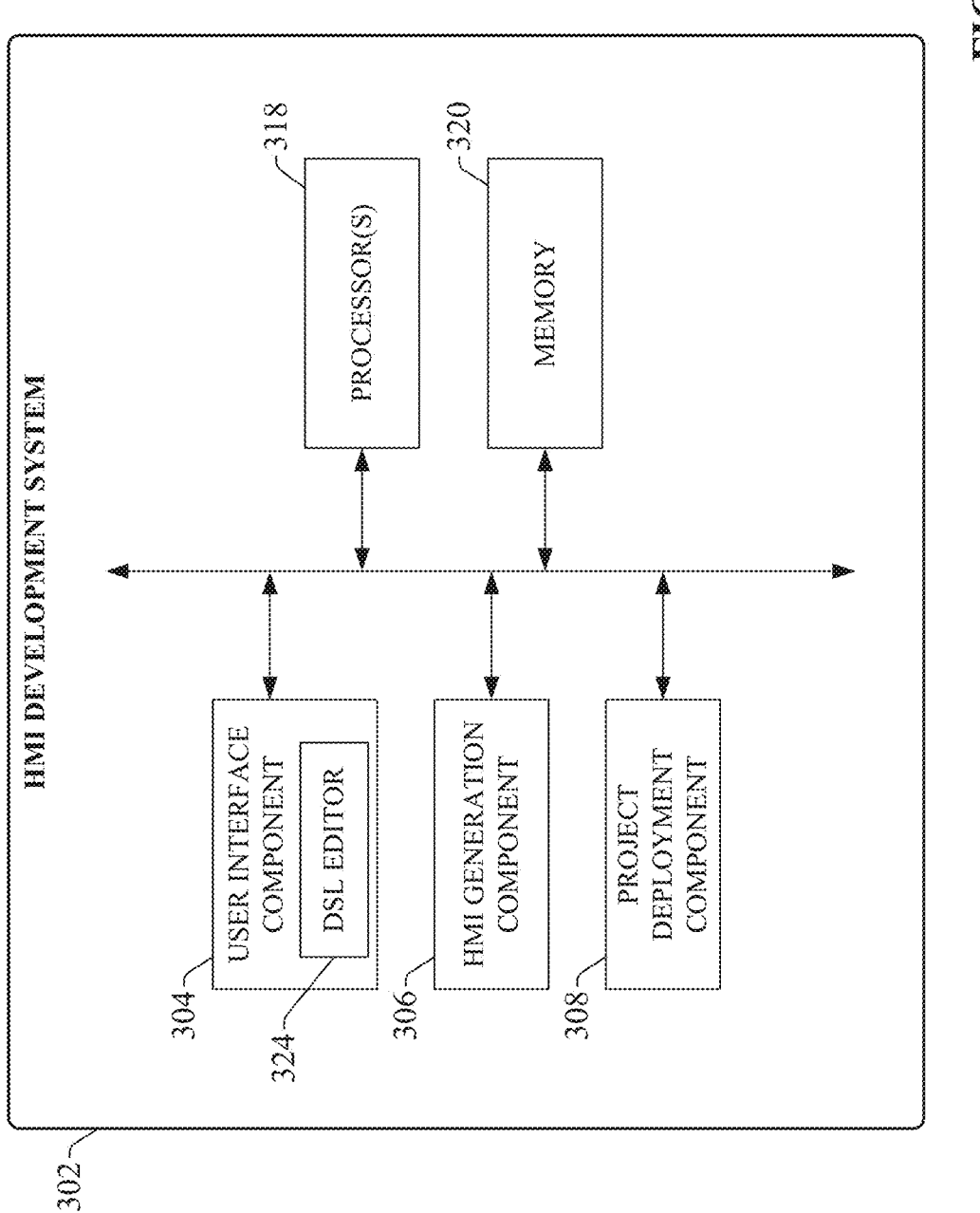
FIG. 3 is a block diagram of an example HMI development system.

FIG. 3 is a block diagram of an example HMI development system 302 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

HMI development system 302 can include a user interface component 304 including a DSL editor 324, an HMI generation component 306, a project deployment component 308, one or more processors 318, and memory 320. In various embodiments, one or more of the user interface component 304, HMI generation component 306, project deployment component 308, the one or more processors 318, and memory 320 can be electrically and/or communicatively coupled to one another to perform one or more of the functions of the HMI development system 302. In some embodiments, components 304, 306, and 308, can comprise software instructions stored on memory 320 and executed by processor(s) 318. HMI development system 302 may also interact with other hardware and/or software components not depicted in FIG. 3. For example, processor(s) 318 may interact with one or more external user interface devices, such as a keyboard, a mouse, a display monitor, a touchscreen, or other such interface devices.

User interface component 304 can be configured to receive user input and to render output to the user in any suitable format (e.g., visual, audio, tactile, etc.). In some embodiments, user interface component 304 can be configured to communicatively interface with, or execute on, a client device (e.g., a laptop computer, tablet computer, smart phone, etc.) and to receive user input data from and render output data on the client device. In the case of cloud-based, web-based, or server-based implementations of the system 302, user interface component 304 can be configured to generate and serve suitable interface screens (e.g., program development screens) to the client device, and exchange data via these interface screens. Input data that can be received via various embodiments of user interface component 304 can include, but is not limited to, DSL programming that describes features of an industrial HMI, and which can be translated by the system 302 to a corresponding HMI application. Output data rendered by various embodiments of user interface component 304 can include program code, programming feedback (e.g., error and highlighting, coding suggestions, etc.), programming and visualization development screens, project testing results, or other such output.

HMI generation component 306 can be configured to create an HMI application based on a HMI DSL program or code, written using a custom programming language, received via the user interface component 304. Project deployment component 308 can be configured to commission the HMI application created by the HMI generation component 306 to an appropriate execution platform, such as an HMI terminal.

The one or more processors 318 can perform one or more of the functions described herein with reference to the systems and/or methods disclosed. Memory 320 can be a computer-readable storage medium storing computer-executable instructions and/or information for performing the functions described herein with reference to the systems and/or methods disclosed.

Figure 4:
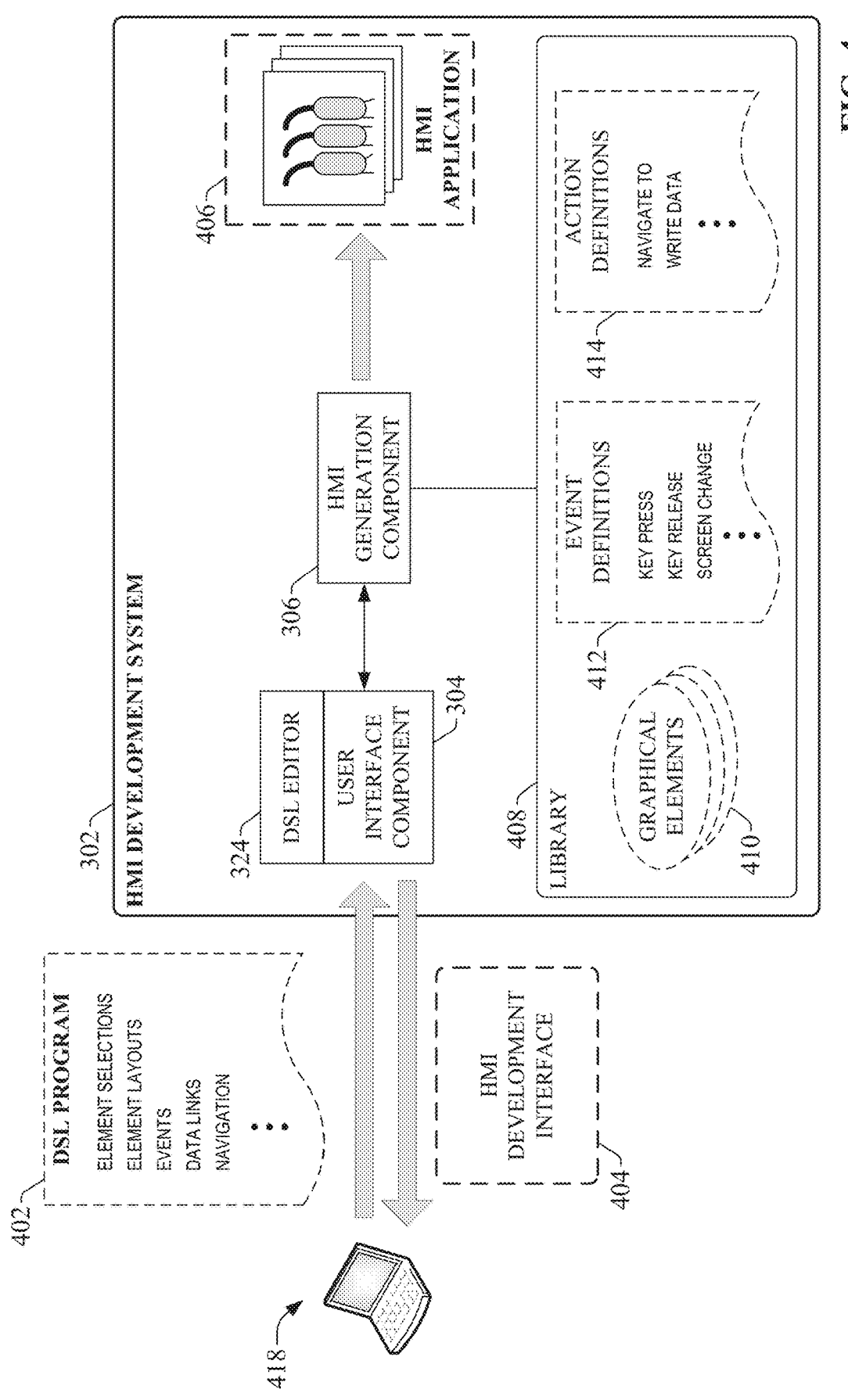
FIG. 4 is a diagram illustrating a generalized architecture of an HMI development system.

FIG. 4 is a diagram illustrating a generalized architecture of the HMI development system 302 according to one or more embodiments. As noted above, the HMI development system 302 supports development and creation of an executable HMI application 406 using a text-based, HMI-specific DSL. In this example, the user interface component 304 can generate and serve an HMI development interface 404 to a client device 418 that communicatively interfaces with the development system 302. FIG. 4 illustrates a scenario in which the development system 302 executes as a shared resource on a cloud platform or another type of platform that is accessible to authorized users (e.g., an on-premise server or on a web-based platform). In other embodiments, the development system 302 can execute locally on client device 418.

The HMI development interface 404 serves as a programming interface for the system's DSL editor 324. The user can enter, via interaction with the development interface 404, a textual HMI DSL program 402 having a syntax defined and supported by the DSL editor 324. Alternatively, since the HMI DSL is a textual programming language, any text editor can be used to write the DSL program 402 for a given HMI application 406, and the user can then submit the program 402 to the system 302 for compiling. As will be described in more detail herein, the custom DSL syntax consists of user domain elements and terminology corresponding to the elements and terminology found in graphical HMI editors. For example, the DSL program 402 can define the display screens that will make up the HMI application 406, graphical elements to be included on each display screen as well as the layouts of those elements, parameters and properties of the elements, animation properties of the elements, links to the controller data tags whose values will drive the animations of the elements, event definitions (e.g., pushbutton press or release events), commands to be initiated in response to detection of specified events, the navigation structure for the displays screens, network settings for the HMI terminal on which the HMI application 406 will execute, and other properties of the HMI.

The DSL editor 324 can compile the DSL program 402 submitted by the user, and the HMI generation component 306 can translate this compiled code into an HMI application 406 capable of execution on an HMI terminal. When executed on an HMI terminal or other computing device with display capabilities, the resulting HMI application 406 implements the defined HMI, including rendering the display screens associated graphics and animations, executing defined commands in response to detected events, and implementing other behaviors of the HMI defined by the DSL program 402.

In some embodiments, the DSL editor 324 and HMI generation component 306 can reference element definitions stored in a library 408 maintained by the development system 302 in connection with compiling the DSL program 402 and generating the corresponding HMI application 406. This library content can include definitions of graphical elements 410 that can be referenced within the DSL program 402 and added to the HMI application 406 by the HMI generation component 306 (e.g., animated machine graphics, alphanumeric text objects, animated fill graphics, graphical pushbuttons or other interactive controls, etc.). The library 408 can also include event definitions 412 and action definitions 414 that define the HMI events (e.g., key press, key release, screen change, etc.) and actions (e.g., screen navigation, data writes to controller tags, etc.) that can be referenced using DSL syntax. These various HMI-specific program elements can be defined using the same DSL syntax used by the end user programmers to develop HMI applications. In some embodiments, the library 408 may also include predefined DSL code segments corresponding to commonly used HMI properties, which can be selectively added to the user's DSL program 402. These predefined code segments can serve as preformatted code templates comprising the syntax structure for specific types of common HMI behaviors or properties (e.g., display screen navigation structures, pushbutton "on press" events or "on release" events, setpoint entry code, etc.).

Figure 5:
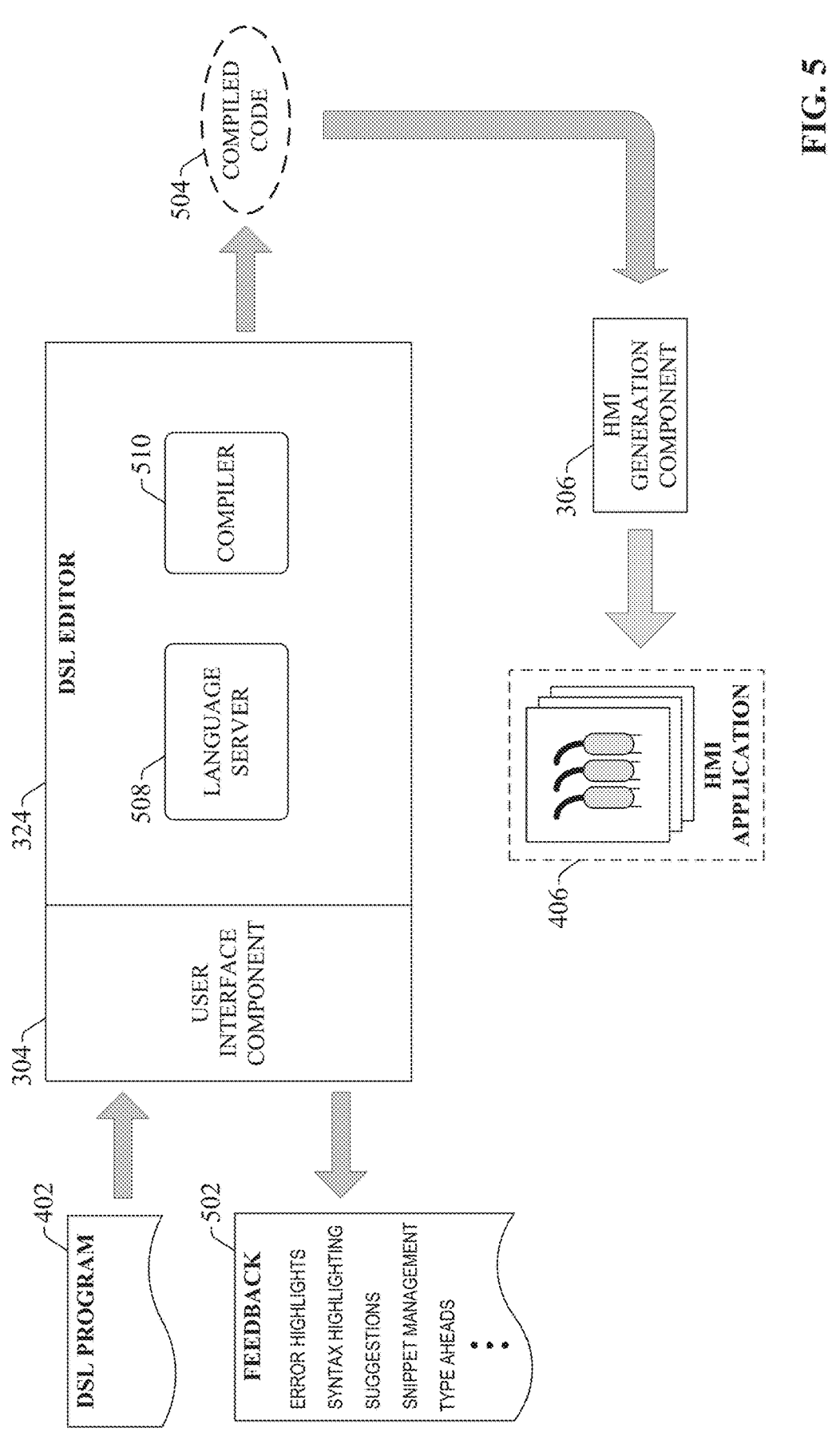
FIG. 5 is a diagram illustrating the use of a DSL editor to develop, compile, and generate an HMI application using custom DSL programming.

FIG. 5 is a diagram illustrating the use of the DSL editor 324 to develop, compile, and generate an HMI application 406 using custom DSL programming. As noted above, a user can enter DSL programming describing the structure, properties, and behaviors of an HMI application 406 via HMI development interface 404. In some embodiments, as the user is writing the DSL program 402, the DSL editor 324 can generate editing feedback 502 that provides dynamic assistance during DSL programming. Editing feedback 502 supported by the DSL editor 324 can include, but is not limited to, error highlighting, syntax highlighting, code snippet management, type-ahead or autocomplete functionality, intelligent programming suggestions, and other such tools. Some or all of these programming services can be provided by a language server 508 associated with the DSL editor 324. Some types of editing feedback 502 can be generated based on predefined development rules that are specific to HMI development, as well as rules imposed by the grammar of the custom DSL itself.

For example, editor 324 can generate notifications during development warning the developer that an action or animation that the user has assigned to a graphical element is not supported by that element, or that the positional coordinates that the user has assigned to a graphical element are outside the boundaries of the display screen's perimeter. In another example, the DSL grammar can specify the syntax for a given type of HMI element or property, including the valid characters for the element's identifier and the number and data types of any parameters that should or can be defined for the elements. The editing feedback 502 can provide guidance to the user as this element type is being written to ensure that the correct syntax is used and that the element's parameters accord with their corresponding data types (e.g., by auto-completing portions of the syntax, rendering information about a parameter that needs to be entered at the current cursor location, or color-coding incorrectly entered syntax or data type mismatches). The rules can ensure that valid data types are used for each parameter that is passed to a graphical element, command, event, screen, or other HMI property. The DSL grammar can also specify, for a given type of graphical element, any events, commands, or animations that are supported by that graphical element, and the editing feedback can guide the user through the process of entering values or settings for these properties. In another example, the development rules may enforce hierarchical relationships between HMI-specific class or object types by ensuring that only valid child classes are defined as children of parent classes.

When the user has completed development of the DSL program 402, the DSL editor's compiler 510 can translate the DSL program 402 into compiled code 504, which can then be translated to a corresponding HMI application 406 by the HMI generation component 306. The HMI application 406 is executable on an HMI terminal to implement the HMI described by the DSL program 402.

The following examples illustrate possible DSL formats for defining various aspects of an HMI application 406. It is to be appreciated, however, that other programming syntaxes for defining HMIs using a custom DSL programming are within the scope of one or more embodiments.

In general the HMI-specific DSL described herein can be used to define actions, graphic elements, animations, layouts of graphical elements, events, and other HMI properties that are typically defined using graphical and menu-driven HMI development platforms. Actions are commands that are initiated in response to a detected event, such as a user interaction with an HMI element or control (e.g., on-press or on-release pushbutton actions, touch press and touch release actions), a screen transition, or other such HMI events. These actions may include, for example, writing a data value to a specified data tag, navigating to a specified display screen, rendering a pop-up display screen, or other such actions. The DSL language used to describe such actions can also specify static or dynamic parameters that are to be passed to the action (e.g., a value that is to be written, a target controller data tag to which the value is to be written, an identifier of a display screen to be displayed, or other such parameters). Some types of actions that are associated with specific graphical elements, such as graphical pushbutton actions, can be defined within the DSL program that defines those graphical elements.

Animations refer to changes to a graphical element's visual properties as a function of a value of a controller data tag to which the element is linked (e.g., a color change animation, a size animation, a position animation, a fill animation, etc.). As with action definitions, the DSL language used to define an animation can include values of static or dynamic parameters to be passed to the animation as appropriate. An animation can be defined within the DSL programming used to define the graphical element to which the animation applies, and may also include a specification of the data tag whose value determines the visual state of the animation. An animation state can also be written as a mathematical function that uses one or more data tags as variables, such that a visual property of the associated graphical element (e.g., color, size, fill level, etc.) is determined based on the output of the function given the current values of the data tags.

DSL syntax for graphical elements that make up the HMI can define properties of the graphical element's static and dynamic properties. If desired, DSL programming can be written that defines a composite graphical element made up of multiple individual graphical elements with their own actions and animations. The DSL syntax for a graphical element may also include layout information describing the position of the element within its associated display screen, either in terms of absolute coordinates or relative to other graphical elements.

An example DSL syntax for declaring a graphical element within an HMI application can have the following format:

```
graphicElement [name] {
    <class properties' value>
    <bindable properties declaration>
    <child graphic Elements>
    <available animations>
    <available events>
}
``` where graphicElement is a keyword representing of the type of graphic element being declared (e.g., Pushbutton, Vat, Tank, Textbox, Conveyor, etc.) and name is a name assigned to the graphic element. The graphic name used for graphicElement can conform to the nomenclature used by the HMI software, programming language, or user to reference the graphic type. As shown in this example, the DSL syntax used to declare a graphical element is delineated by the graphic name (the term used for graphicElement; e.g., Button for a graphical pushbutton, Tank for a tank graphic, Textbox for an ASCII entry field, NumBox for a numerical entry box, etc.) followed by a user-defined name assigned to the graphic. Graphic elements that can be declared using this syntax can include both animated graphics as well as static graphical elements such as lines, ellipses, and rectangles. Any properties associated with the graphical element can be entered within brackets following the graphical element name (e.g., class properties, bindable properties whose values are linked to a controller's data tag or another data source, values of static parameters, identities of child graphic elements associated with the parent graphical element, animation and event parameters, etc.). Any properties associated with the element that are not given an explicit value in the DSL syntax assume their default values. In general, properties can be bound to any expression consisting of a controller tag element, mathematical expression, logical expression, function, or other forms of programming that return a value for the property. Once defined, the graphical element can be referenced as a class within the DSL program to define instances of the element.

A similar DSL syntax format can be used to define actions or commands to be initiated by the HMI application in response to detected events. For example, a command can be defined using the following general format:

```
Command [name] (<parameters>) {
    <class properties' values>
}
``` where Command represents the keyword to identify the command and name is the name of the command. Parameters associated with the defined command can be entered in parenthesis after the name of the command, and the values of any class properties associated with the specified command can be entered in brackets after the parameters.

Using this format, a command to navigate from a currently displayed screen to another specified screen can be defined using the following example DSL syntax:

```
Command NavigateTo (required input ScreenRef screen,
    input_unchecked_array parameters) {
        displayName:="Navigate To";
        category:="Navigation"
        categoryItemName:="Screen Navigate"
    }
```

Once defined, the command can be referenced as a class throughout the DSL program as needed to define instances of the command. Other HMI-specific classes, such as events and screens, can also be defined using similar syntax.

Using the formats described above, a graphical pushbutton can be declared using the following DSL syntax (where comment lines are delineated by double forward slashes):

```
graphicElement Button {
    //class based properties
    Desc:="this is a button";
    Icon:=" ";
    // bindable properties that are available to this graphic element
    // declaring the properties of this graphic element
    String Text:="button" //default value
    String Opacity -> {
    Controller1.tagA?"10":"100"
    }
    Int FontSize:=14;
    Int someOtherMember
    // available events
    KeyPress;
    KeyRelease;
    TouchPress;
    TouchRelease;
    // available animations
    }
```

Declaring the button graphic in this manner allows the user to add instances of the declared button within the HMI project as needed. As shown in this example, parameters for the pushbutton can include the text string to be displayed on the pushbutton (Text), a size of the text (FontSize), an opacity of the pushbutton (Opacity, which in this example is defined as a function of a value of a specified controller tag Controller1.tagA), or other such parameters. The DSL syntax can also define available events that can be associated with the button (e.g., a KeyPress event, a KeyRelease event, a TouchPress event, and a TouchRelease event), as well as animation properties (e.g., color change animations). Events that can be associated with a graphical element can be defined in the library 408 as part of the event definitions 412. In some embodiments, DSL syntax can be supported that allows various types of buttons to be defined, such as momentary, maintained, latched, or multistate buttons.

Once declared, the pushbutton can be referenced by other parts of the DSL program 402. For example, the following DSL syntax can be used to define a pop-up screen that includes the declared button:

```
Screen popup myScreen {
    Button myButton {
        X:=10;
        Y:=10;
        pressUp {
            NavigateTo(viewApp.Screen_001, #{controller1.tagA,
            controller2.tagB})
        }
    }
    Button myOtherButton {
        button myChildButton;
    }
}
```

As illustrated in this example, the DSL syntax used to declare a popup screen is delineated by the keywords Screen popup, followed by the name of the screen (e.g., myScreen in this example). For some types of graphic elements for which different types are available, a modifier can be after the graphicElement keyword to indicate the type. In the example syntax above, the modifier popup is used after Screen to designate a popup screen that will be rendered as an overlay on a currently displayed screen. Properties associated with the screen, as well as graphical elements to be included on the screen, can be entered within brackets following the screen name. In this case, the previously declared pushbutton is referenced by name (Button) within the brackets and assigned the name myButton, which creates an instance of the pushbutton definition on the defined popup screen. Parameters of the pushbutton are included within brackets following the myButton reference. These parameters include the position of the button on the popup screen in terms of x and y coordinates (x: =10, y: =10). The pushbutton parameters also include a pressUp event definition and a corresponding action to be initiated when the pushbutton is pressed. In this example, the action is a screen navigation command (NavigateTo) that causes the HMI to navigate to another screen (viewApp.Screen_011), passing the values of the two tags that are also added as parameters of the NavigateTo action (controller1.tagA and controller2.tagB). For this and other types of events associated with the button, the event can be defined by entering the name of the event and specifying the values or arguments of the event's parameters in parentheses after the event name. In this regard, each event type, element type, and action type can have a defined set of parameters or properties that are expected to be entered for those type definitions, and the dynamic feedback 502 can render guidance to the user—in the form of type aheads, suggestions, or auto-completions—that inform the user of the element instance that can be entered, the properties can be set, the parameters that are to be passed in, or other configuration options.

The example syntax above also adds an instance of the button called myOtherButton as a button contained within the myButton. Another instance of button—myChildButton—has also been added within myOtherButton. In this example, the x and y coordinates of child buttons are not required to be specified, but instead default to x=y=0.

In some embodiments, the DSL editor 324 can render the dynamic feedback 502 as the user is entering the DSL programming for an event, element, or action based on the known correct syntax for each event type, element type, and action type. This feedback 502 can include auto-completes, suggestions, or type aheads that guide the user toward correctly formatted syntax for the HMI property being defined. For example, if the user is entering the syntax for a NavigateTo event that defines a transition from a present display screen to another display screen, which has a format

```
NavigateTo(<Screen Name>,#{tag1,..., tagN})
``` where tag1, . . . , tagN are one or more data tags to which the identity of the target display screen is to be written, the DSL editor 324 can, in response to detecting that the user has entered the NavigateTo keyword, auto-complete at least a part of the completed syntax, including indications of where the screen name and the data tags are to be entered. The dynamic feedback 502 can also indicate portions of the DSL program that do not comply with an expected format; e.g., by coloring incorrectly formatted text in red or rendering a suggest correction that will correct the format.

According to another example, a display screen that includes an instance of the button can be described using the following example DSL syntax:

```
Screen myScreen {
    Button myButton {
        Text:="OK";
        isEnabled -> {someBoolTag == 1;}
        PressUp ( ) { //event on button
            closePopup( );
        }
        KeyRelease(keys.l2) {
```

-continued

```
          navigateTo(viewAp.Screen2,
             #{myButton.Text, someTag} );
          }
       }
  }
```

This example DSL syntax declares an HMI screen called myScreen, which includes an instance of the previously defined button (Button) called myButton. The screen is declared using the keyword Screen followed by the name of the screen (myScreen). Any elements to be included on the screen, as well as any events or actions associated with the screen, are defined within brackets following the screen name. Accordingly, the instance of Button is defined within these brackets by entering the keyword Button followed by the name of the button (myButton). Properties associated with the myButton instance—including text displayed on the button, controller data tags whose values are to be linked to the pressed or released state of the button, or actions to be taken in response to events such as touch release events— are defined within brackets following the myButton name. In the example depicted above, the user has defined text to be rendered on the button ("OK") using the Text property. In addition, the isEnabled property is used to specify a Boolean data tag (someBoolTag) whose value is to be set to 1 when the button is enabled. The pressUp event keyword is used to define an action to be taken (closePopup) when a touch release event occurs. The KeyRelease event keyword is used to define an action to be taken when the key is released after being pressed. In this example, the action is a navigation to another display screen, which is defined using the navigateTo action keyword followed by the name of the destination display screen (view App.Screen2) and any other relevant parameters in brackets.

In some embodiments, the user can store selected segments of the DSL program 402 in the library 408 as a code segment for reuse. These code segments can be retrieved from the library and inserted into DSL programs 402 for other HMI project as needed.

Substantially any type of graphical element that is part of an HMI design can be defined using DSL syntax having formats similar to the examples depicted above. Example elements that can be defined using HMI-specific DSL syntax can include, but are not limited to, display screens, various types of graphical pushbuttons (e.g., momentary, maintained, latched, multistate, etc.), animated machine graphics (e.g., vats with fill animations, conveyor graphics, motor graphics, robot graphics, etc.), static or animated geometric shapes (e.g., lines, rectangles, ovals, etc.), graphical position switches, static or dynamic alphanumeric text, data entry controls such as text boxes or control list selectors, screen selection controls, graph objects that are linked to values of specified data tags, alarm window objects, or other such objects. In some embodiments, the custom DSL can also be used to declare user-defined add-on graphics to the HMI project.

For graphical elements having animation properties— such as machine graphics or data display elements whose color, fill level, position, or character content is a function of one or more data tag values—the DSL programming for those elements can include a definition of the one or more data tags whose values control the visual state of each animation property. The relationship between the data tag values and the animation state (e.g., the ranges of values of the data tag value corresponding to respective colors of a color animation, the maximum and minimum values of the data tag that correspond to 100% full and 0% full for a fill animation, etc.) can also be defined using the DSL syntax. The DSL syntax can also be used to define an animation state of a graphical element as a function of a user-defined mathematical expression (e.g., an arithmetic or Boolean expression) that uses one or more specified data tag values as variables.

Substantially any type of HMI-related event can be defined using DSL programming described herein. Some events may be specific to a type of graphical element, such as a graphical pushbutton or switch, and can be entered as a parameter of those elements as shown in the examples above. Example HMI events that can be defined using the HMI-specific DSL can include, but are not limited to, an on-press event, an on-release event, a screen change event, a touch press event, a touch release event, a data entry or data change event, or other such events. Events can be invoked using suitable keywords supported by the DSL, which can be entered as parameters of an associated graphical element definition.

Actions that can be defined using the HMI-specific DSL can include, but are not limited to, initiating a change from a currently rendered display screen to a different display screen, initiating a display of a pop-up screen over a currently displayed screen, writing a value to a specified controller data tag, changing an animation or display property of a specified graphic, or other such actions. As with the events, actions can be defined using suitable keywords supported by the DSL and can be entered as parameters of an associated graphical element or event definition.

Properties of graphical objects that can be set using the HMI-specific DSL can include, but are not limited to, color, size, font, text, opacity, location on a display screen (e.g., in terms of cartesian coordinates), a binding to a specified controller data tag, an indication of whether the object is to be moved in front of any other graphical objects with which the graphical element overlaps, or other such properties.

The DSL can also support text-based syntax for defining other configuration parameters of the HMI application, including but not limited to communication or network settings for communicating with one or more industrial controllers 118 with which the HMI will exchange data.

Figure 6:
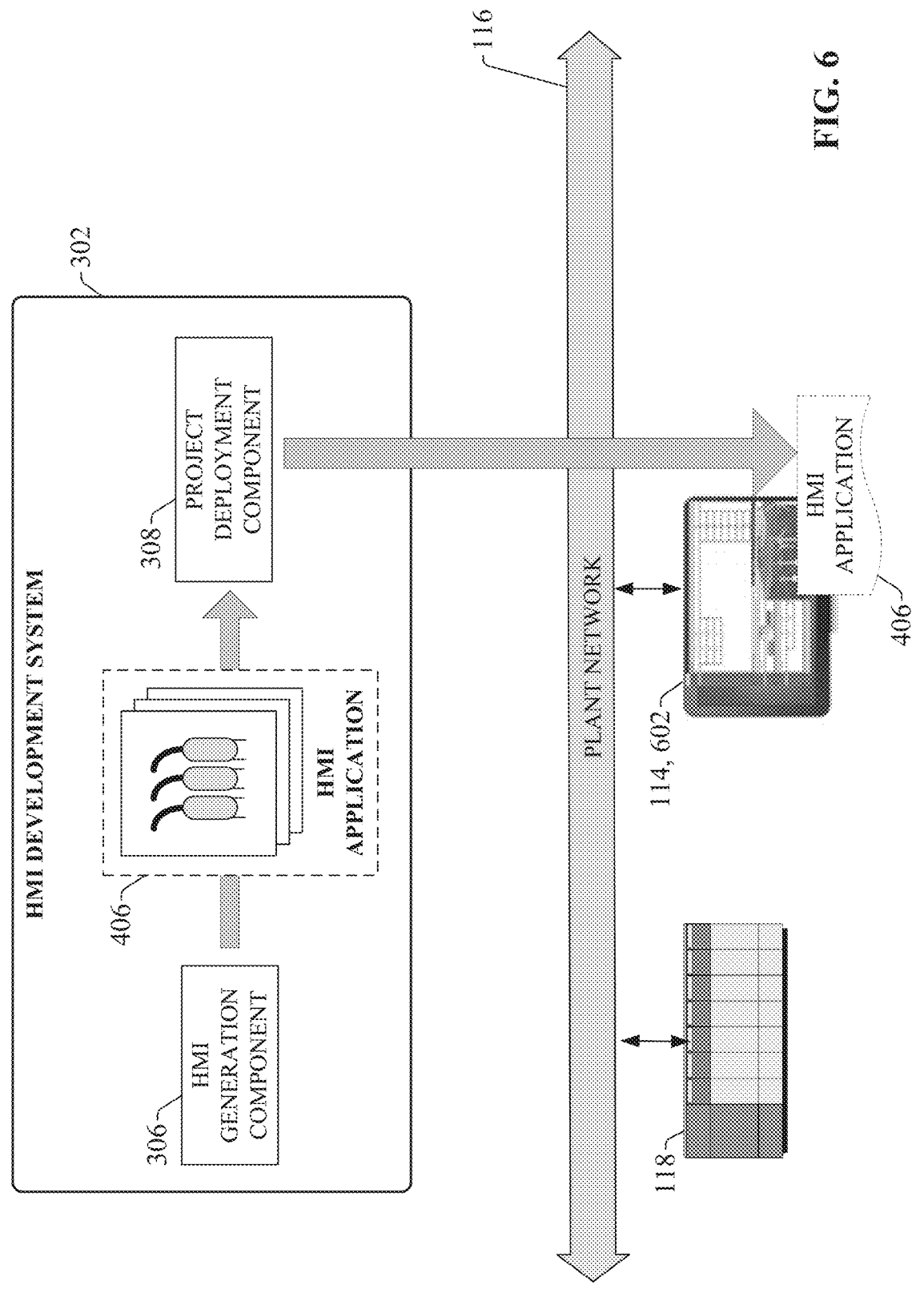
FIG. 6 is a diagram illustrating commissioning of an HMI application to an HMI terminal.

Once development on an HMI project has been completed and the HMI generation component 306 has generated an HMI application 406 based on the user's DSL program 402, the HMI application 406 can be deployed to an HMI terminal or other computing platform with display capabilities for execution. FIG. 6 is a diagram illustrating commissioning of an HMI application 406 to an HMI terminal 602. The system's project deployment component 308 can communicatively interface with an HMI terminal 602 via either a direct connection between the development system 302 and the terminal 602 or, in the case of embodiments of the system 302 that execute on a cloud platform or other remote platform, via a remote connection to the terminal 602. When executed on the HMI terminal 602, the complied HMI application 406 renders an HMI 114 having the display screens and associated graphical elements and behaviors defined by the DSL program 402. In cases in which the DSL program 402 also defines communication parameters for the HMI terminal 602 itself, execution of the HMI application 406 will set the terminal's networking or communication settings in accordance with the communication settings defined in the DSL program 402. This may include, for example, setting the terminal's networking parameters to operate on the plant network 116 as well as setting the HMI's communication settings so that the terminal 602 will communicate with the industrial controller 118 with which the HMI 114 will exchange data.

The custom HMI-specific DSL described herein allows industrial HMI applications to be developed using a text-based coding having syntax idioms and structures familiar to users of other programming languages, while supporting specific HMI user domain elements. The DSL program 402 can be written and viewed using any textual editor as an alternative to graphical and menu-driven HMI development platforms, and may be used within the context of editors that support advanced DSL programming capabilities such as syntax highlighting, auto-completes, and type aheads. The DSL text is explicit in terms of the HMI concepts with limited constructs from the surrounding text language, in contrast to general purposes languages such as extensible markup language (XML) in which the concepts are verbose in terms of the XML constructs. The language allows users to easily described the content, structure, and behaviors of an HMI application using terminology known to HMI developers.

Additionally, since the custom DSL allows an HMI application to be described using a purely textual syntax, text-based version control functions can be applied to the DSL program 402 for a given HMI application 406. These version control functions can include tracking of changes made to the program 402, comparison and merging of different versions of the DSL program 402, or other such functions. The use of a textual DSL to develop HMI applications can also streamline aspects of the development process by allowing the user to leverage text-based editing approaches, including copying and pasting of program content across different parts of the HMI project. Moreover, the DSL programs 402 can be stored as relatively lightweight files that are easily shared between multiple developers and can be edited without the use of expensive and more functionally intensive graphical HMI editing platforms.

FIG. 7 illustrates an example methodology in accordance with one or more embodiments of the subject application. While, for purposes of simplicity of explanation, the methodology shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 7 illustrates an example methodology 700 for defining an HMI application using a custom, HMI-specific DSL programming. Initially, at 702, DSL programming that defines an HMI project is received via interaction with a DSL editor or a standard text editor. The DSL programming defines the HMI project in terms of the display screens that make up the HMI, graphical elements included on the display screens (e.g., animated machine graphic, static or dynamic alphanumeric display objects, graphical controls such as pushbuttons and switches, etc.), animation configurations associated with the graphical elements, data bindings between the graphical elements and controller data tags for animation or control purposes, or other such HMI properties. One or more of these HMI properties can be defined as classes, and instances of the classes can be defined as needed within the DSL program. The DSL language used to describe commands, graphical elements, animations, events, layouts, and other HMI properties can allow for passing of parameters to those elements.

At 704, if a DSL editor is used, programming feedback is rendered by the DSL editor in accordance with defined HMI definition rules. These rules can ensure that the various elements of the DSL program are correctly formatted and do not define invalid HMI configurations or property hierarchies. For example, the HMI definition rules can ensure that valid data types are used for each parameter that is passed to a graphical element, command, event, screen, or other HMI property. The rules can also ensure that only valid child classes are defined as children of parent classes. The programming feedback can also ensure that correct DSL syntax is used to define the various elements of the HMI. The feedback can be rendered using any suitable format, including but not limited to error highlighting, syntax highlighting, intelligent type-ahead or autocomplete functionality, programming suggestions, or other such feedback.

At 706, a determination is made as to whether programming of the HMI project is complete. If programming is not complete (NO at step 706), the methodology returns to step 702 and programming of the HMI project continues. Alternatively, if programming is complete (YES at step 706), the methodology proceeds to step 708, where the DSL program is saved as an HMI definition file. The HMI definition file is a text file comprising the DSL program, and can be shared and edited using standard text-based editing features. For example, the HMI definition file can be compared with another HMI definition file for a similar HMI using a redline compare action that identifies differences between the two files. A compare and merge action can also be applied to two different versions of an HMI definition file.

At 710, the HMI definition file is compiled to yield an HMI application that, when executed on an HMI terminal or another type of computing device with display capabilities, implements the HMI project defined by the DSL program.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 8:
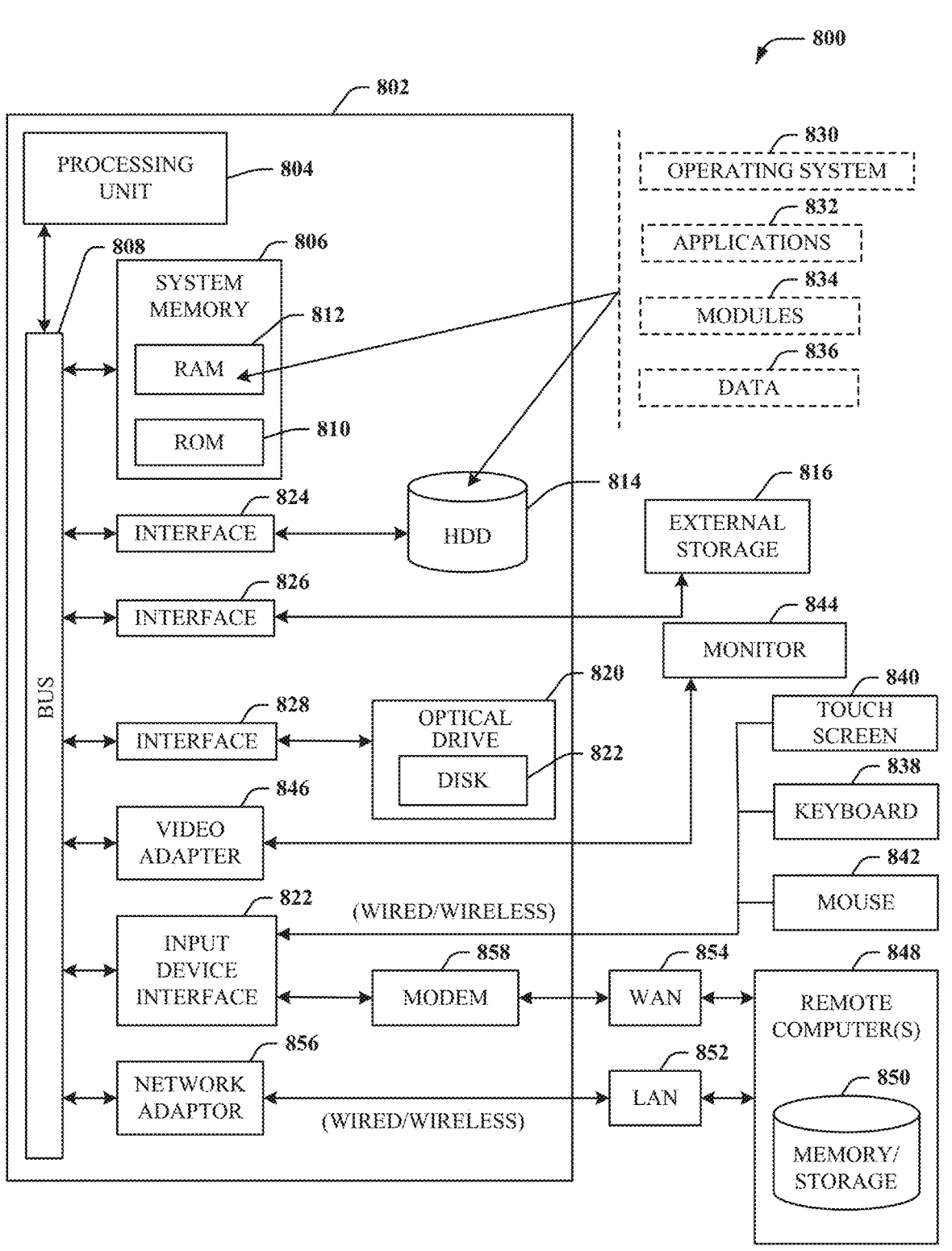
FIG. 8 is an example computing environment.
Figure 9:
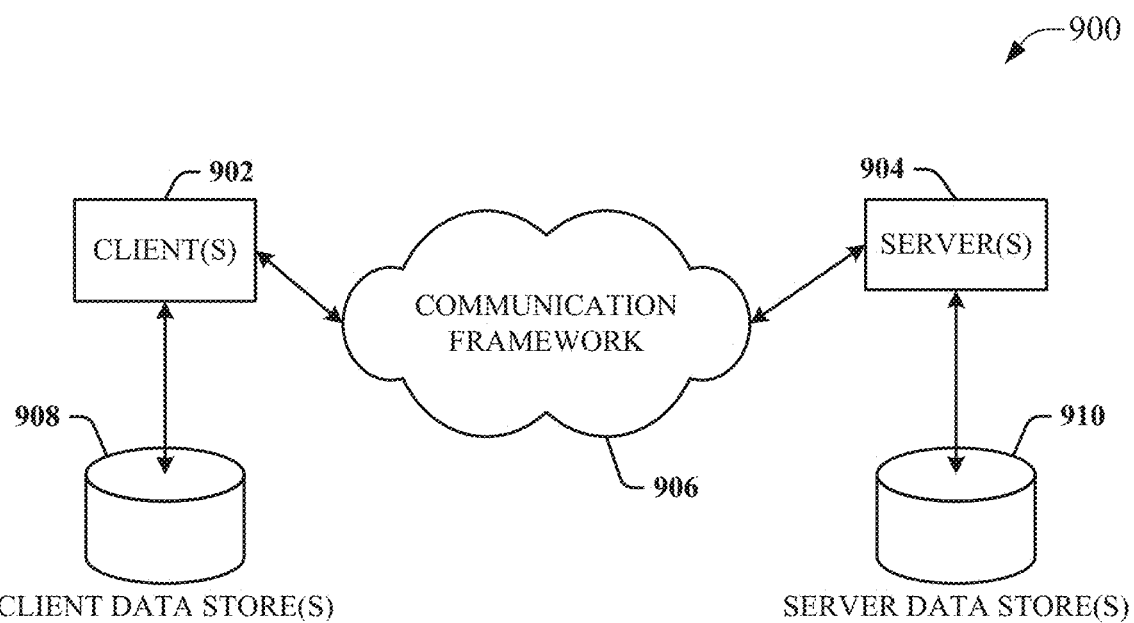
FIG. 9 is an example networking environment.

In order to provide a context for the various aspects of the disclosed subject matter, FIGS. 8 and 9 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 8, the example environment 800 for implementing various embodiments of the aspects described herein includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi-processor architectures can also be employed as the processing unit 804.

The system bus 808 can be any of several types of bus structure that can further interconnect to a memory bus (with or without a memory controller), a peripheral bus, and a local bus using any of a variety of commercially available bus architectures. The system memory 806 includes ROM 810 and RAM 812. A basic input/output system (BIOS) can be stored in a non-volatile memory such as ROM, erasable programmable read only memory (EPROM), EEPROM, which BIOS contains the basic routines that help to transfer information between elements within the computer 802, such as during startup. The RAM 812 can also include a high-speed RAM such as static RAM for caching data.

The computer 802 further includes an internal hard disk drive (HDD) 814 (e.g., EIDE, SATA), one or more external storage devices 816 (e.g., a magnetic floppy disk drive (FDD) 816, a memory stick or flash drive reader, a memory card reader, etc.) and an optical disk drive 820 (e.g., which can read or write from a CD-ROM disc, a DVD, a BD, etc.). While the internal HDD 814 is illustrated as located within the computer 802, the internal HDD 814 can also be configured for external use in a suitable chassis (not shown). Additionally, while not shown in environment 800, a solid state drive (SSD) could be used in addition to, or in place of, an HDD 814. The HDD 814, external storage device(s) 816 and optical disk drive 820 can be connected to the system bus 808 by an HDD interface 824, an external storage interface 826 and an optical drive interface 828, respectively. The interface 824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 812, including an operating system 830, one or more application programs 832, other program modules 834 and program data 836. All or portions of the operating system, applications, modules, and/or data can also be cached in the RAM 812. The systems and methods described herein can be implemented utilizing various commercially available operating systems or combinations of operating systems.

Computer 802 can optionally comprise emulation technologies. For example, a hypervisor (not shown) or other intermediary can emulate a hardware environment for operating system 830, and the emulated hardware can optionally be different from the hardware illustrated in FIG. 8. In such an embodiment, operating system 830 can comprise one virtual machine (VM) of multiple VMs hosted at computer 802. Furthermore, operating system 830 can provide runtime environments, such as the Java runtime environment or the .NET framework, for application programs 832. Runtime environments are consistent execution environments that allow application programs 832 to run on any operating system that includes the runtime environment. Similarly, operating system 830 can support containers, and application programs 832 can be in the form of containers, which are lightweight, standalone, executable packages of software that include, e.g., code, runtime, system tools, system libraries and settings for an application.

Further, computer 802 can be enable with a security module, such as a trusted processing module (TPM). For instance with a TPM, boot components hash next in time boot components, and wait for a match of results to secured values, before loading a next boot component. This process can take place at any layer in the code execution stack of computer 802, e.g., applied at the application execution level or at the operating system (OS) kernel level, thereby enabling security at any level of code execution.

A user can enter commands and information into the computer 802 through one or more wired/wireless input devices, e.g., a keyboard 838, a touch screen 840, and a pointing device, such as a mouse 842. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 804 through an input device interface 844 that can be coupled to the system bus 808, but can be connected by other interfaces, such as a parallel port, an IEEE 1394 serial port, a game port, a USB port, an IR interface, a BLUETOOTH® interface, etc.

A monitor 844 or other type of display device can be also connected to the system bus 808 via an interface, such as a video adapter 846. In addition to the monitor 844, a computer typically includes other peripheral output devices (not shown), such as speakers, printers, etc.

The computer 802 can operate in a networked environment using logical connections via wired and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wired/wireless connectivity to a local area network (LAN) 852 and/or larger networks, e.g., a wide area network (WAN) 854. Such LAN and WAN networking environments are commonplace in offices and companies, and facilitate enterprise-wide computer networks, such as intranets, all of which can connect to a global communications network, e.g., the Internet.

When used in a LAN networking environment, the computer 802 can be connected to the local network 852 through a wired and/or wireless communication network interface or adapter 856. The adapter 856 can facilitate wired or wireless communication to the LAN 852, which can also include a wireless access point (AP) disposed thereon for communicating with the adapter 856 in a wireless mode.

When used in a WAN networking environment, the computer 802 can include a modem 858 or can be connected to a communications server on the WAN 854 via other means for establishing communications over the WAN 854, such as by way of the Internet. The modem 858, which can be internal or external and a wired or wireless device, can be connected to the system bus 808 via the input device interface 822. In a networked environment, program modules depicted relative to the computer 802 or portions thereof, can be stored in the remote memory/storage device 850. It will be appreciated that the network connections shown are example and other means of establishing a communications link between the computers can be used.

When used in either a LAN or WAN networking environment, the computer 802 can access cloud storage systems or other network-based storage systems in addition to, or in place of, external storage devices 816 as described above. Generally, a connection between the computer 802 and a cloud storage system can be established over a LAN 852 or WAN 854 e.g., by the adapter 856 or modem 858, respectively. Upon connecting the computer 802 to an associated cloud storage system, the external storage interface 826 can, with the aid of the adapter 856 and/or modem 858, manage storage provided by the cloud storage system as it would other types of external storage. For instance, the external storage interface 826 can be configured to provide access to cloud storage sources as if those sources were physically connected to the computer 802.

The computer 802 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 9 is a schematic block diagram of a sample computing environment 900 with which the disclosed subject matter can interact. The sample computing environment 900 includes one or more client(s) 902. The client(s) 902 can be hardware and/or software (e.g., threads, processes, computing devices). The sample computing environment 900 also includes one or more server(s) 904. The server(s) 904 can also be hardware and/or software (e.g., threads, processes, computing devices). The servers 904 can house threads to perform transformations by employing one or more embodiments as described herein, for example. One possible communication between a client 902 and servers 904 can be in the form of a data packet adapted to be transmitted between two or more computer processes. The sample computing environment 900 includes a communication framework 906 that can be employed to facilitate communications between the client(s) 902 and the server(s) 904. The client(s) 902 are operably connected to one or more client data store(s) 908 that can be employed to store information local to the client(s) 902. Similarly, the server(s) 904 are operably connected to one or more server data store(s) 910 that can be employed to store information local to the servers 904.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A method, comprising:

receiving, by a system comprising a processor, a domain-specific language (DSL) program comprising text-based code that describes at least a display screen of a human-machine interface (HMI) application, a graphical element to be rendered on the display screen, and an animation associated with the graphical element, wherein a syntax of the text-based code comprises at least a keyword indicating a type of the graphical element, a user-defined name of the graphical element following the keyword, and one or more parameters of the animation following the name of the graphical element;

rendering, by the system during the receiving of the DSL program, programming feedback based on application of development rules to the DSL program, wherein the development rules define actions or animations that are associated with the type of the graphical element and are permitted to be assigned to the type of graphical element, and the programming feedback comprises information specifying the animations that are associated with the type of graphical element and parameters associated with the animations, the animations comprising at least one of a color change animation, a size animation, a position animation, or a fill animation; and compiling, by the system, the DSL program to yield an executable HMI application that, in response to execution on an HMI terminal, implements the HMI application, wherein the compiling comprises creating the graphical element having the type, the user-defined name, and the one or more parameters defined by the DSL program.

2. The method of claim 1, wherein the graphical element is at least one of a graphical pushbutton, a graphical switch, an animated machine graphic, a geometric shape, a text display object, a numeric display object, a data entry control, a screen selection control, a graph object or an alarm window object.

3. The method of claim 1, wherein a portion of the DSL program that declares the display screen or the graphical element defines a name of the display screen or the graphical element, properties of the display screen or the graphical element, and available events associated with the display screen or the graphical element.

4. The method of claim 3, wherein the available events comprise at least one of a button press event, a button release event, a touch press event, a touch release event, a screen change event, a data entry event, or a data change event.

5. The method of claim 1, wherein the DSL program describes, as the animation, a visual state of the graphical element as a function of a value of a controller tag defined by the DSL program or as a function of an expression.

6. The method of claim 5, wherein the visual state is at least one of a color, a fill level, a position, an opacity, text content, or numeric content.

7. The method of claim 1, wherein the rendering of the programming feedback comprises rendering at least one of error highlighting, syntax highlighting, type-ahead recommendations, or programming suggestions.

8. The method of claim 7, wherein the development rules further verify that location coordinates assigned to a graphical object correspond to a location that is within a boundary of a display screen to which the DSL program assigns the graphical object, enforce valid formatting of the DSL syntax, ensure that valid data types are used for respective parameters, or enforce hierarchical relationships between class or object types defined by the DSL program.

9. A system for developing human-machine interface (HMI) applications, comprising:

a memory that stores executable components; and a processor, operatively coupled to the memory, that executes the executable components, the executable components comprising:

a user interface component configured to receive, as a text-based input submitted via a development interface, domain-specific language (DSL) programming that defines aspects of an HMI application, wherein the aspects comprise at least a display screen of the HMI application, a graphical element to be included on the display screen, and an animation associated with the graphical element, and a syntax of the DSL programming comprises at least a keyword indicating a type of the graphical element, a user-defined name of the graphical element following the keyword, and one or more parameters of the animation following the name of the graphical element; and an HMI generation component configured to compile the DSL programming to yield an executable HMI application capable of execution on an HMI terminal, wherein compiling of the DSL programming comprises creating the graphical element having the type, the user-defined name, and the one or more parameters defined by the DSL programming, the user interface component is configured to render programming feedback as the DSL programming is being entered based on application of development rules to the DSL programming, the development rules define actions or animations that are associated with the type of the graphical element and are permitted to be assigned to the type of the graphical element, and the programming feedback comprises information specifying the animations that are associated with the type of the graphical element and parameters associated with the animations, the animations comprising at least one of a color change animation, a size animation, a position animation, or a fill animation.

10. The system of claim 9, wherein the DSL programming defines, as the graphical element, at least one of a graphical pushbutton, a graphical switch, an animated machine graphic, a geometric shape, a text display object, a numeric display object, a data entry control, a screen selection control, a graph object or an alarm window object.

11. The system of claim 9, wherein a portion of the DSL programming that declares the display screen or the graphical element comprises a name of the display screen or the graphical element, properties of the display screen or the graphical element, and available events associated with the display screen or the graphical element.

12. The system of claim 11, wherein the available events comprise at least one of a button press event, a button release event, a touch press event, a touch release event, a screen change event, a data entry event, or a data change event.

13. The system of claim 11, wherein the properties comprise at least one of a size, text to be displayed, a binding to a specified controller data tag, a color, or a location.

14. The system of claim 9, wherein the DSL programming defines, as the animation, a visual state of the graphical element as a function of a value of a controller tag defined by the DSL programming or as a function of an expression.

15. The system of claim 14, wherein the visual state is at least one of a color, a fill level, a position, an opacity, text content, or numeric content.

16. The system of claim 9, wherein the programming feedback comprises at least one of error highlighting, syntax highlighting, type-ahead recommendations, or programming suggestions.

17. The system of claim 16, wherein the development rules further verify that location coordinates assigned to the graphical element correspond to a location that is within a boundary of the display screen to which the DSL programming assigns the graphical element, enforce DSL syntax formatting, ensure that valid data types are used for respective parameters, or enforce hierarchical relationships between class or object types defined by the DSL programming.

18. A non-transitory computer-readable medium having stored thereon instructions that, in response to execution, cause a system comprising a processor to perform operations, the operations comprising:

receiving text-based design input for a human-machine interface (HMI) application, wherein the text-based design input comprises domain-specific language (DSL) programming that describes at least a display screen of the HMI application, a graphical element to be rendered on the display screen, and an animation associated with the graphical element, wherein a syntax of the DSL programming comprises at least a keyword indicating a type of the graphical element, a user-defined name of the graphical element following the keyword, and one or more parameters of the animation following the name of the graphical element;

rendering, during the receiving of the DSL programming, programming feedback based on application of development rules to the DSL program, wherein the development rules define actions or animations that are associated with the type of the graphical element and are permitted to be assigned to the type of graphical element, and the programming feedback comprises information specifying the animations that are associated with the type of graphical element and parameters associated with the animations, the animations comprising at least one of a color change animation, a size animation, a position animation, or a fill animation; and compiling the DSL programming to yield an executable HMI application that, in response to execution on an HMI terminal, implements the HMI project, wherein the compiling comprises creating the graphical element having the type, the user-defined name, and the one or more parameters defined by the DSL programming.

19. The non-transitory computer-readable medium of claim 18, wherein the graphical element is at least one of a graphical pushbutton, a graphical switch, an animated machine graphic, a geometric shape, a text display object, a numeric display object, a data entry control, a screen selection control, a graph object or an alarm window object.

20. The non-transitory computer-readable medium of claim 18, wherein a portion of the DSL programming that declares the display screen or the graphical element defines a name of the display screen or the graphical element, properties of the display screen or the graphical element, and available events associated with the display screen or the graphical element.

\* \* \* \* \*